United States Patent [19]

Fukushima et al.

[11] 4,407,397
[45] Oct. 4, 1983

[54] SHOCK ABSORBER WITH PRESSURE-RELIEF MECHANISM

[75] Inventors: Naoto Fukushima, Fujisawa; Kunihiko Hidaka, Kamakura; Kazuroh Iwata, Yokohama, all of Japan

[73] Assignee: Nissan Motor Co., Ltd., Kanagawa, Japan

[21] Appl. No.: 306,181

[22] Filed: Sep. 28, 1981

[30] Foreign Application Priority Data

Oct. 16, 1980 [JP] Japan ............................ 55-147793[U]
Oct. 29, 1980 [JP] Japan ................................ 55-151737

[51] Int. Cl.³ ............................................... F16F 9/34
[52] U.S. Cl. .................................... 188/282; 188/320; 188/322.14; 188/322.15
[58] Field of Search ............... 188/269, 282, 316, 319, 188/317, 320, 322.13, 322.14, 322.15

[56] References Cited

U.S. PATENT DOCUMENTS 3,362,508 1/1968 Mayer ................................ 188/319
3,672,474 6/1972 Mayer et al. ...................... 188/282

FOREIGN PATENT DOCUMENTS 909661 4/1954 Fed. Rep. of Germany .................... 188/322.14
845638 5/1939 France ................................ 188/320

Primary Examiner—Duane A. Reger
Attorney, Agent, or Firm—Schwartz, Jeffery, Schwaab, Mack, Blumenthal & Koch

[57] ABSTRACT

A shock absorber with improved shock absorbing characteristiscs has a piston in which a vortex chamber is formed. The vortex chamber communicates with upper and lower fluid chambers via communication passages. One of the communication passage opens to the vortex chamber tangentially to produce a vortex in the vortex chamber. Within the vortex chamber, a member is normally elastically urged to narrow the area through which the fluid flows. The member is responsive to the fluid pressure exceeding a predetermined value to move against the resilient force in the direction increasing the area allowing fluid flow. A bottom fitting of similar construction and function is also disclosed.

7 Claims, 21 Drawing Figures

SHOCK ABSORBER WITH PRESSURE-RELIEF MECHANISM

BACKGROUND OF THE INVENTION

The present invention relates generally to a hydraulic shock absorber with a vortex valve therein. More specifically, the invention relates to a shock absorber capable of effectively preventing the shock absorber from producing excessive absorbing force.

A shock absorber having a vortex chamber in the piston thereof for producing an absorbing force against a shock applied thereto is well known. Typical construction of such shock absorber has been disclosed in the U.S. Pat. No. 3,362,508 to Mayer. In the U.S. Pat. No. 3,362,508, there is illustrated a shock absorber having a piston in sliding engagement with a cylinder, dividing the cylinder into first and second chambers. A vortex chamber is mounted on the piston with an axial passageway for communication with the first chamber, tangential and radial passageways for communication with the second chamber, and a member with an opening which is movable with respect to the piston to vary the restriction of the radial and axial passageways. A similar vortex valve shock absorber has also been disclosed in the U.S. Pat. No. 3,672,474 to Mayer et al. In the U.S. Pat. No. 3,672,474, there is disclosed a shock absorber, which produces a flowrate tailored to fit a pressure difference relationship, including a laminar flow device and an orifice restriction connected to a radial-and-tangential inlet of a vortex valve, with both connected in parallel to the upstream pressure source. Flow across the assemblage will be such that the vortex valve will act like a smaller orifice at lower flows and a large orifice at high flows, or vice versa, due to the shifting of the respective shares of the total flow accommodated by the laminar flow device and the orifice restriction. This arrangement is incorporated into a shock absorber to produce improved output damping characteristics.

U.S. Pat. No. 3,672,474 has a means for relieving the excessive fluid pressure in the vortex chamber. The relieving means comprises a plurality of radially-extending multiconduit fluid passages. The fluid passages permit fluid flow therethrough regulated by the fluid pressure in the vortex chamber. Although this will be effective for relieving excessive fluid pressure when the piston stroke becomes larger than a predetermined value or the piston speed becomes higher than a predetermined value, it will also reduce the absorbing force produced by the vortex when the piston stroke is smaller than the predetermined value or the piston speed is lower than the predetermined value.

Another typical conventional construction of the pressure-relieving means for excessive fluid pressure produced by the vortex in the vortex chamber comprises a fluid passage formed in the piston and a resilient closure member provided for closing one end of the fluid passage in response to a set pressure given to the resilient closure member. According to this construction, the fluid pressure in the vortex chamber can be prevented from increasing excessively.

The present invention is to improve the conventional construction of the shock absorber with a resilient closure member in order to provide improved shock absorbing characteristics.

SUMMARY OF THE INVENTION

Therefore, it is an object of the present invention to provide a shock absorber having a fluid pressure relieving means of simple construction for preventing the shock absorber from producing excessive absorbing force and in order to provide improved shock absorbing characteristics.

To accomplish the above-mentioned and other objects, there is provided a shock absorber, according to the present invention, having a piston in which a vortex chamber is formed. The vortex chamber communicates with upper and lower fluid chambers via communication passages. One of the communication passages opens to the vortex chamber tangentially to produce a vortex in the vortex chamber. Within the vortex chamber, a resiliently-urged member narrows the area through which the fluid flows, in the normal condition. The member is responsive to fluid pressure exceeding a predetermined value to move in the direction increasing the area allowing fluid flow.

According to one embodiment of the present invention, there is provided a shock absorber comprising a hollow cylinder defining therein a fluid chamber filled with a working fluid, a piston movably disposed within the fluid chamber to divide the fluid chamber into first and second chambers, the piston being formed with a circular recess on one of plane surfaces thereof, a resilient member disposed within the circular recess and defining a vortex chamber together with the piston, the resilient member having means for defining first and second fluid passages for communication between the first chamber and the vortex chamber, the second passage being normally closed and responsive to a pressure difference between the first chamber and the vortex chamber greater than a set pressure provided to the resilient member, and means for establishing communication between the second chamber and the vortex chamber such that the fluid flowing into the vortex chamber from the second chamber generates a vortex in the vortex chamber.

According to another embodiment, a shock absorber comprises an inner hollow cylinder defining therein a fluid chamber filled with a working fluid, an outer hollow cylinder of slightly larger diameter concentric with the inner cylinder, the outer cylinder defining a fluid reservoir chamber outside the inner cylinder;

a reciprocating piston movably disposed within the fluid chamber to divide the fluid chamber into first and second chambers, said piston having a circular first recess on the lower plane surface, the first recess communicating with the first chamber via first vortex passages which opens tangentially into the first recess, a first valve member disposed within the first recess to define therein a vortex chamber, the first valve member defining a first passage constantly open for communication between the vortex chamber and the second chamber and a second passage, the first valve member being movable between a first position in which the second passage is closed and a second position where the second passage is open; a fitting attached to the lower end of the inner cylinder, which defines a circular second recess therein, the second recess communicating with the second chamber via second vortex passages opening tangentially into the second recess; and a second valve member disposed within the second recess of the fitting to define within the second recess a second vortex chamber, the second valve member defining a third passage constantly open for communication between the second vortex chamber of the fitting and the fluid reservoir chamber, and a fourth passage, the second valve member being movable between a first position where the fourth passage is closed and a second position where the fourth passage is open, the second valve member being responsive to the fluid pressure difference between the vortex chamber and the fluid reservoir chamber to move from the first position to the second position when the pressure difference is greater than a predetermined value.

BRIEF DESCRIPTION OF THE DRAWINGS

The present invention will be more fully understood from the detailed description given herebelow and from the accompanying drawings of the preferred embodiments of the present invention, which, however, should not be taken as limitative to the invention but for elucidation and explanation only.

In the drawings.

DESCRIPTION OF THE PREFERRED EMBODIMENT

Figure 1:
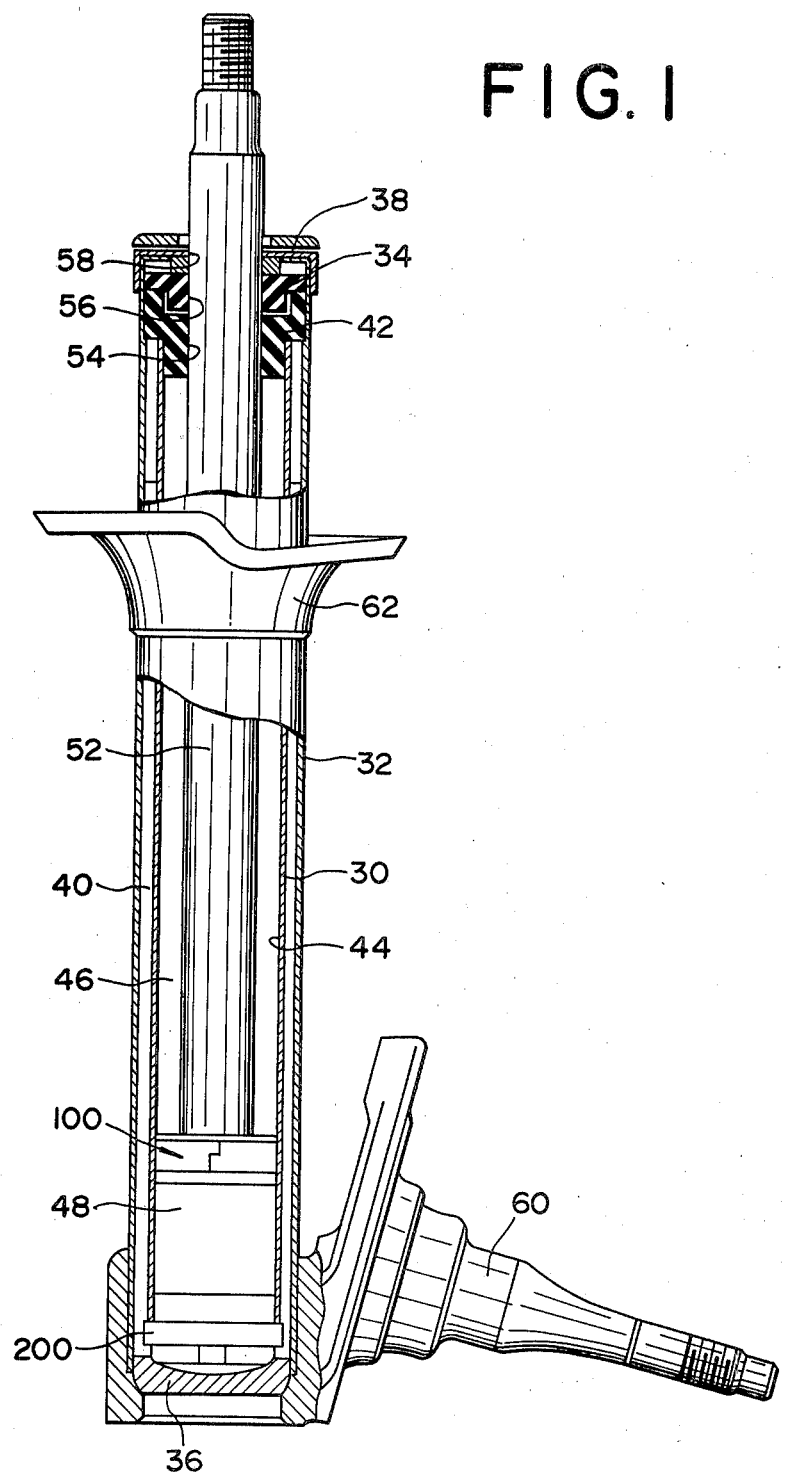
FIG. 1 shows a longitudinal section of a first embodiment of a direct-acting shock absorber according to the present invention.

Referring now to the drawings, particularly to FIG. 1, there is shown a general construction of a shock absorber including the first embodiment of a piston and a bottom fitting according to the present invention. The shock absorber has coaxially-arranged inner and outer cylinders 30 and 32. The outer cyliner 32 is sealingly closed at both ends with end fittings 34 and 36. A cap 38 is engaged at the top of the outer cylinder 32 for closing the top and preventing the end fitting 34 from loosening. The concentric inner and outer cylinders, 30 and 32 respectively, are of slightly-differing diameters in order to define a fluid reservoir chamber 40 therebetween. The fluid reservoir chamber 40 is filled with a gas to absorb and compensate for the pressure of the working fluid. The upper end of the inner cylinder 30 is sealingly closed with an end fitting 42. On the other hand, bottom fitting 200 of the first embodiment is attached to the lower end of the inner cylinder 30 so that it defines a fluid chamber 44 within the inner cylinder. A piston 100 of the preferred embodiment is slidably disposed within the fluid chamber 44 to divide the latter into upper and lower chambers, 46 and 48 respectively. The piston 100 is fixedly attached onto the lower end of a piston rod 52. The piston rod 52 extends upwards through openings 54, 56 and 58 formed in the end fittings 42 and 34 and the cap 38 respectively to connect the piston 100 with the vehicle body, such as an outer shelf (not shown), for example. A steering knuckle 60 may be attached on the outer periphery of the outer cylinder adjacent the lower end thereof. A spring seat 62 for a suspension spring (not shown) may also be attached to the outer periphery of the outer cylinder 32.

It will be appreciated that the steering knuckle 60 and the spring seat 62 are not always provided for the shock absorber of the present invention. Therefore, these are illustrated only for explanation and should not be assumed to be essential to the subject matter of the invention.

The detailed description of the first embodiment of the piston 100 and the bottom fitting 200 is given herebelow with reference to FIGS. 2 to 7.

Figure 2:
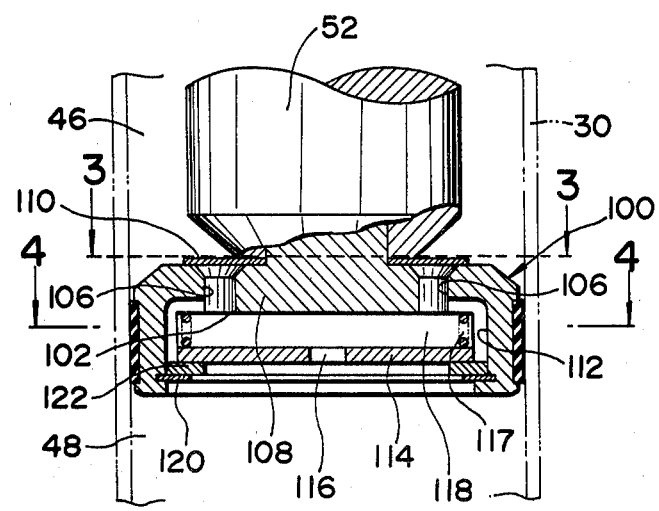
FIG. 2 shows an enlarged partial section of a piston employed in the shock absorber of FIG. 1.
Figure 3:
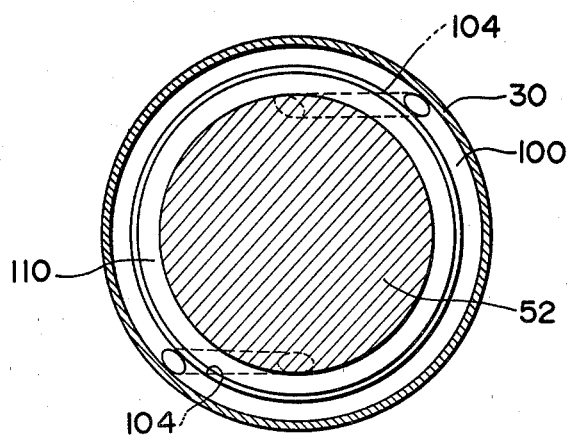
FIG. 3 is an enlarged top view of the piston of FIG. 2, taken along line 3—3 of FIG. 2.
Figure 4:
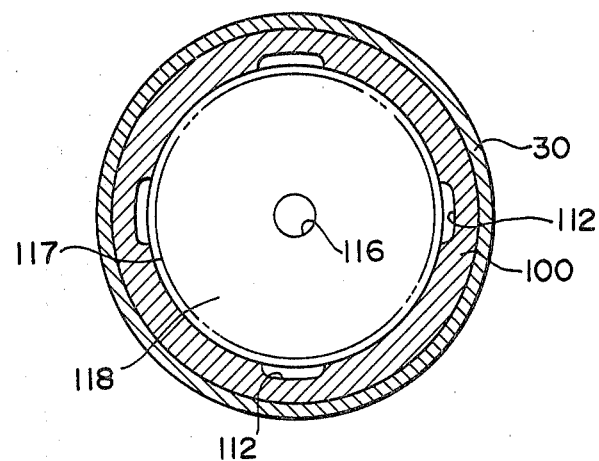
FIG. 4 shows an enlarged cross-section of the piston of FIG. 2, taken along line 4—4 of FIG. 2.

As shown in FIGS. 2 to 4, the piston 100 has a circular recess 102. A pair of vortex passages 104 is formed in the piston 100, and each has an outer end opening onto the upper surface and an inner end tangentially opening into the circular recess 102. A plurality of vertical openings 106 are formed in the piston 100 and extend vertically through the horizontal section 108 of the piston. The upper ends of the vertical openings 106 are closed by an annular valve member 110, the inner edge of which is inserted between the piston rod 52 and the horizontal section 108 of the piston to be fixedly secured. A plurality of recesses 112 are formed on the inner periphery of the piston 100 and extend between the lower ends of the vertical openings 106 and of the circular recess 102.

A disc-shaped plate 114 is disposed within the circular recess 102. The disc-shaped plate 114 is formed with an aperture 116 in the central portion thereof. The disc-shaped plate 114 is urged in the direction away from the inner surface of the horizontal section 108 by a coil spring 117 to define therebetween a vortex chamber 118. A stop ring 120 is secured on the internal circumference of the circular recess 102 near the lower end thereof. A sealing pad 122 is mounted on the upper surface of the stop ring 120. In the normal position, the sealing pad 122 contacts the the disc-shaped plate 114.

Figure 5:
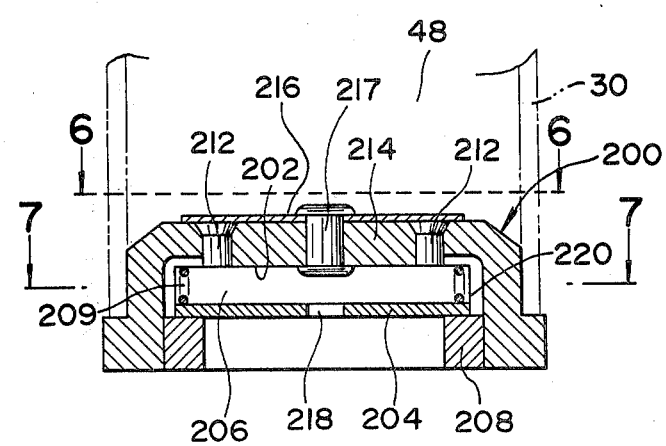
FIG. 5 shows an enlarged cross-section of a bottom fitting employed in the shock absorber of FIG. 1.
Figure 6:
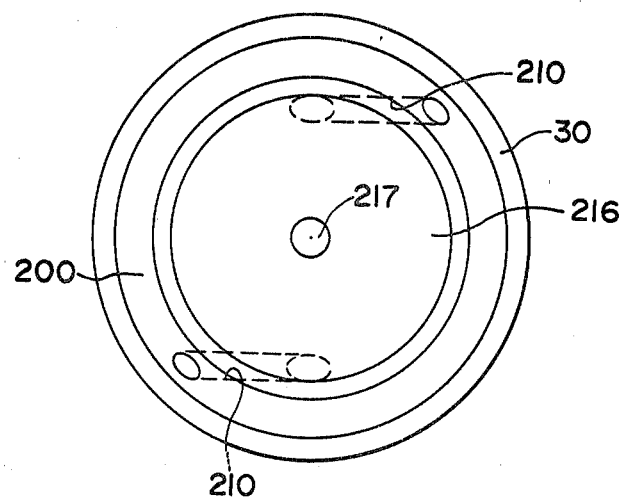
FIG. 6 is an enlarged top view of the bottom fitting of FIG. 5, taken along line 6—6 of FIG. 5.
Figure 7:
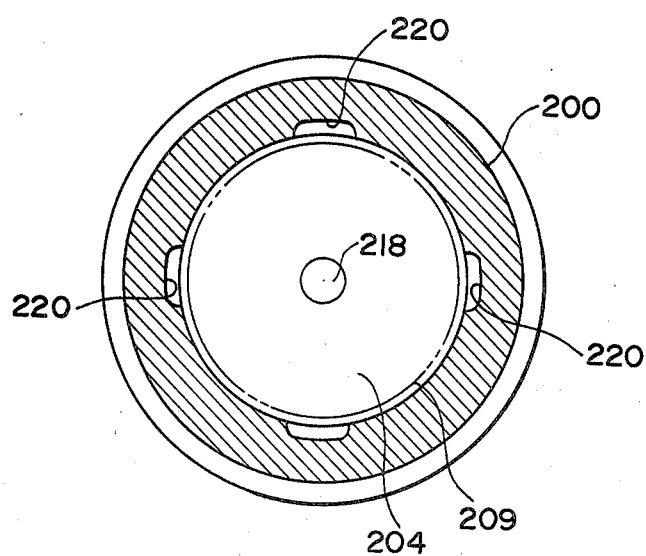
FIG. 7 shows an enlarged cross-section of the bottom fitting of FIG. 5, taken along line 7—7 of FIG. 5.

FIGS. 5 to 7 show the first embodiment of the bottom fitting 200 which is attached to the lower end of the inner cylinder 30. The bottom fitting 200 has substantially the same construction as that of the piston 100. A circular recess 202 is formed in the lower surface of the bottom fitting 200. A disc-shaped plate 204 is movably disposed within the circular recess 202 to define therebetween a vortex chamber 206. The disc-shaped plate 204 is urged by a coil spring 209 toward an annular stop 208 attached to the internal periphery of the circular recess 202.

The vortex chamber 206 communicates with the lower chamber 48 via a pair of vortex passages 210 formed in the bottom fitting 200. The vortex passage 210 has an outer end opening into the lower chamber 48 and an inner end tangentially opening into the vortex chamber 206. Also, the vortex chamber 206 communicates with the lower chamber 48 via a plurality of vertical passages 212 extending vertically through the horizontal section 214 of the bottom fitting. An elastic leaf valve member 216 is secured on the upper surface of the horizontal section 214 by a rivet 217 to elastically close the upper end of the vertical passages 212.

The vortex chamber 206, in turn, communicates with the fluid reservoir chamber 40 via a central aperture 218 in the disc-shaped plate 204. In addition, the bottom fitting 200 is formed with a plurality of recesses 220 extending vertically along the internal periphery of the circular recess 202 and further extending horizontally to the lower end of the vertical passages 212.

In the compression stroke of the piston in response to a shock applied to the shock absorber, the volume of the upper chamber 46 is increased and, in turn the volume of the lower chamber 48 is reduced to produce fluid flow from the lower chamber to the upper chamber. The fluid flows into the vortex chamber 118 via the aperture 116 of the disc-shaped plate 114. If the fluid pressure in the vortex chamber 118 becomes greater than a set pressure, the valve member 110 is displaced from the upper end of the vertical openings 106 to allow the fluid to flow therethrough. Since the aperture 116 of the disc-shaped plate 114 is small enough to limit fluid flow therethrough, the fluid pressure difference between the vortex chamber 118 and the lower chamber 48 increases in accordance with the piston stroke and piston speed. If the fluid pressure difference between the lower chamber 48 and the vortex chamber 110 becomes greater than a set pressure applied to the disc-shaped plate 114 by the coil spring 117, the disc-shaped plate 114 is moved upwards and thus the recesses 112 communicate with the lower chamber 48.

At the same time, the fluid in the lower chamber 48 flows through the vortex passages 210 and into the vortex chamber 206 in the bottom fitting 200. Due to the fluid flow through the vortex passages 210, a vortex is generated in the vortex chamber 206 to produce an absorbing force against the shock. The increase in fluid pressure in the fluid reservoir chamber 40 is partially absorbed by the compressible gas therein.

In the expansion stroke of the piston, the fluid pressure in the upper chamber becomes greater than that of the lower chamber to cause fluid flow from the upper chamber 46 to the lower chamber 48. The fluid in the upper chamber 46, at first, flows into the vortex chamber 118 via the vortex passages 104. The fluid flow in the vortex chamber 118 produces a vortex limiting the flow of fluid therethrough to produce an absorbing force against the shock.

At the same time, due to expansion of the volume of the lower chamber, the fluid pressure in the fluid reservoir chamber 40 becomes greater than that in the lower chamber 48. Thus, the fluid in the fluid reservoir chamber 40 flows through the bottom fitting 200 into the lower chamber 48. Fluid flow in this direction is limited by the size of the vortex passage 210 to produce some absorbing force. If the pressure difference between the fluid in the vortex chamber 206 and the fluid reservoir chamber 40 becomes greater than a set pressure of the coil spring 209, the disc-shaped plate 204 is moved upwards to establish communication between the recesses 220 formed on the internal circumference of the vortex chamber 206 and the fluid reservoir chamber 40 to allow fluid flow. The fluid in the vortex chamber flows through the vortex passages 210 at a substantially limited rate and thus fluid pressure builds up in the vortex chamber. If the fluid pressure built up in the vortex chamber 206 becomes greater than a set pressure of the valve member 216, the valve member 216 is displaced from the upper ends of the vertical passages 212 to allow fluid flow therethrough.

According to the first embodiment of the present invention as illustrated hereabove, the shock absorbing force in response to relatively small piston stroke and/or piston speed is produced by orifice effect due to the apertures 116 and 218 and vortex passages 104 and 210. On the other hand, against a shock in which the piston stroke and/or piston speed is sufficiently great to produce a vortex in either of vortex chambers 118 and 206, relatively strong shock absorbing force is produced. If the absorbing force becomes greater than a predetermined value, disc-shaped plates 114 and 204 are moved to relieve the absorbing force in order to provide riding comfort. Further in the shown embodiment, during the compression piston stroke, the bottom fitting becomes effective to produce greater absorbing force than that produced by the piston, and the absorbing force of the piston becomes greater than that of the bottom fitting in the piston expansion stroke.

Figure 8:
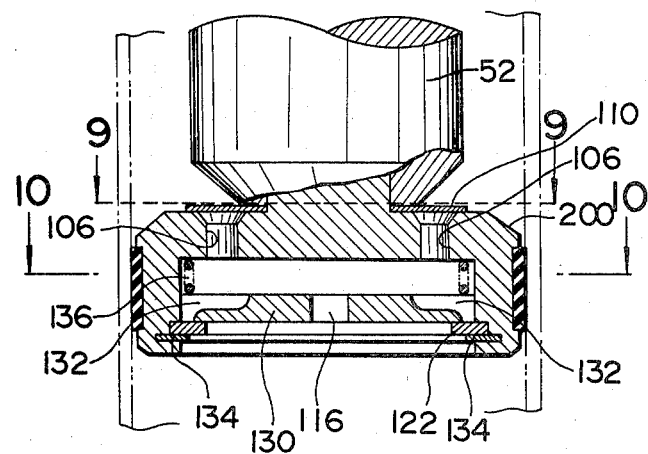
FIG. 8 shows an enlarged partial section, similar to FIG. 3, of a modification of the piston of the first embodiment.
Figure 9:
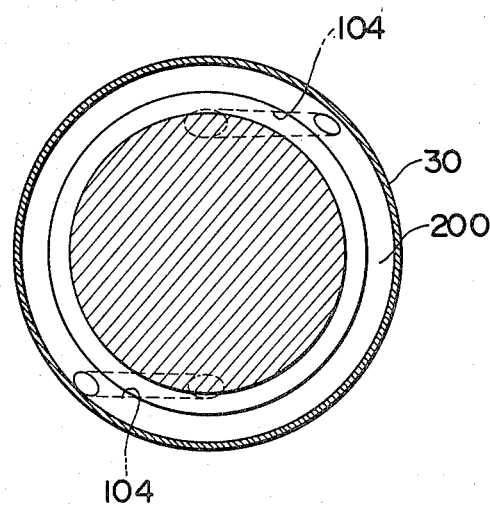
FIG. 9 is an enlarged top view of the piston of FIG. 8, taken along line 9—9 of FIG. 8.
Figure 10:
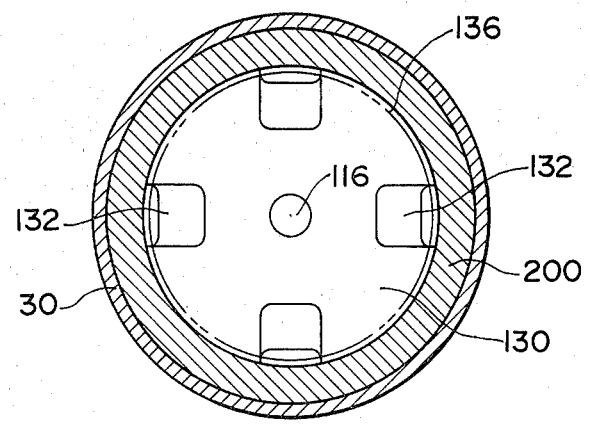
FIG. 10 shows an enlarged cross-section of the piston of FIG. 8, taken along line 10—10 of FIG. 8.

Referring now to FIGS. 8 to 11, there are shown modifications of the first embodiment of the present invention. In FIGS. 8 to 10, the first modification of the piston to be employed in the shock absorber of FIG. 1 is illustrated. In this modification, the shape of the disc-shaped plate 130 is different from its counterpart in the first embodiment. The disc-shaped plate 130 is formed with a plurality of substantially L-shaped cut-outs 132 leading from the circumference thereof. The disc-shaped plate 130 is urged by a coil spring 136 toward a stop 134 secured on the internal circumference of the circular recess 102. In this embodiment, the disc-shaped plate 130 functions substantially the same as that of the foregoing disc-shaped plate of the first embodiment.

Figure 11:
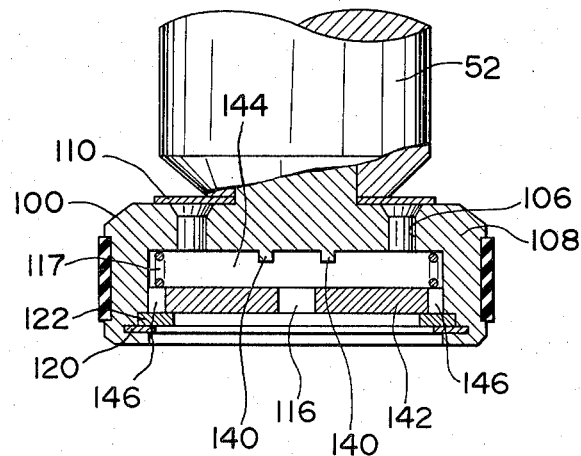
FIG. 11 shows an enlarged section, similar to FIG. 8, of another modification of the first embodiment of the present invention.

FIG. 11 shows a further modification of the first embodiment of the present invention, in which an annular projection 140 is formed on the lower surface of the horizontal section 108 of the piston 100. The annular projection 140 limits the upward motion of the disc-shaped plate 142 for maintaining a minimum volume in the vortex chamber 144. The disc-shaped plate 142 is formed with a plurality of cut-outs 146.

It should be appreciated that the modifications as illustrated hereabove with reference to FIGS. 8 to 12 can be applied not only to the piston but also to the bottom fitting of the shock absorber.

Figure 12:
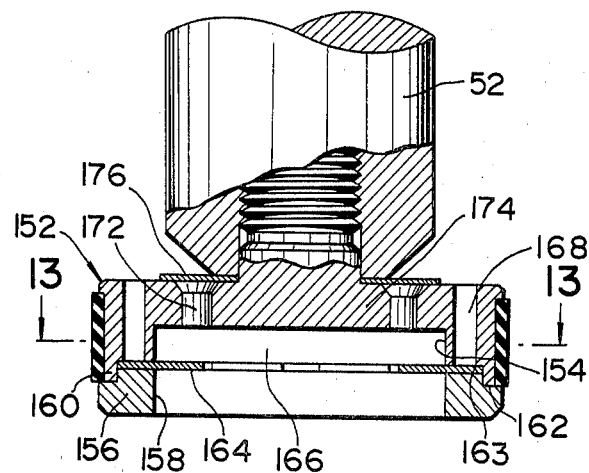
FIG. 12 shows an enlarged partial section, similar to FIG. 11, of a piston employed in the second embodiment of the shock absorber according to the present invention.
Figure 13:
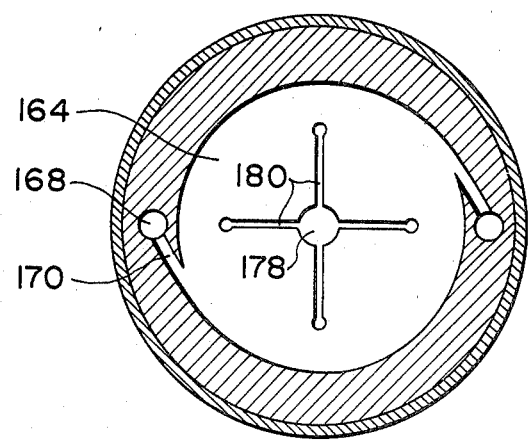
FIG. 13 shows an enlarged cross-section of the piston of FIG. 12 taken along line 13—13 of FIG. 12.

Referring to FIGS. 12 and 13, there is illustrated the second embodiment of the piston for the shock absorber according to the present invention. The piston 150 generally comprises an upper member 152 with a circular recess 154 on the lower surface thereof and an annular lower member 156 with a bore 158. The bore 158 of the lower member 156 has the same diameter to that of the circular recess 154. The upper member 152 is formed with a cut-out 160 along the inner edge of the lower end thereof. On the other hand, the lower member 156 is formed with a cut-out 162 along the outer edge of its upper end to mate with the cut-out of the upper member. As shown in FIG. 12, the upper and lower members 152 and 156 are engaged with each other and secure therebetween the circumferential edge 163 of a resilient plate 164. The resilient plate 164 in conjunction with the upper member 156 defines a vortex chamber 166.

A pair of openings 168 is formed vertically in the upper member 152 near the circumference thereof. The openings 168 are connected to vortex passages 170 having inner ends tangentially opening into the vortex chamber 166. The openings 168, in turn, open to the upper chamber 46 and thus establish communication between the upper chamber 46 and the vortex chamber 166. A plurality of one-way passages 172 are formed vertically in the horizontal section 174 of the upper member 152. The upper end of the one-way passages 172 are closed by a resilient valve member 176 which is secured between the upper horizontal surface of the upper member 152 and the lower end of the piston rod 52.

The resilient plate 164 is formed with a central circular opening 178 and a plurality of round-ended slots 180 extending radially from the central opening 178. The sections of the resilient member 164 separated by the slots 180 are deformed in response to a sufficiently great fluid pressure difference between the vortex chamber 166 and the lower chamber 48.

Figure 14:
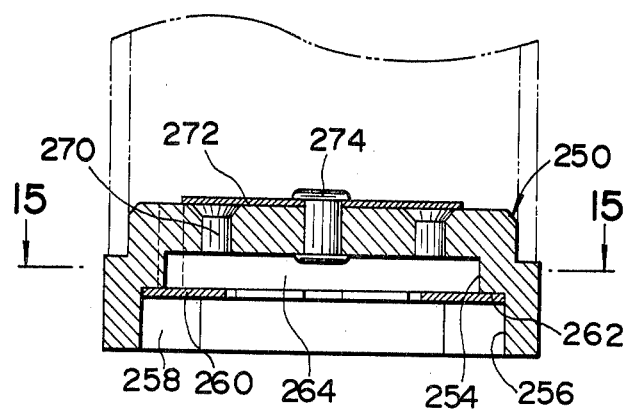
FIG. 14 shows an enlarged longitudinal section of the bottom fitting of the second embodiment according to the present invention.
Figure 15:
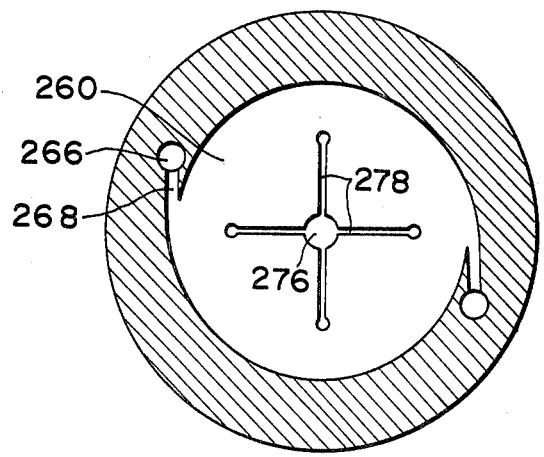
FIG. 15 shows an enlarged cross-section of the bottom fitting of FIG. 14, taken along line 15—15 of FIG. 14.

FIGS. 14 and 15 show the second embodiment of the bottom fitting 250 according to the present invention. The bottom fitting 250 is formed with a stepped circular recess 252 including upper and lower sections, 254 and 256 respectively. In the lower section 256, an annular fitting 258 is received. A resilient plate 260 is secured between the horizontal plane 262 of the step between the upper and lower recesses and the fitting 258. The resilient plate 260 in conjunction with the upper section 254 of the recess 252 defines a vortex chamber 264. The vortex chamber 264 communicates with the lower chamber 48 via a pair of vertical passages 266 and vortex passages 268. One-way passages 270 are formed in the horizontal section of the bottom fitting 250. The upper ends of the one-way passages 270 are closed by a resilient valve member 272 which is secured on the upper surface of the bottom fitting with a rivet 274.

The resilient plate 260 is formed with a central circular opening 276 and a plurality of round-ended slots 278. The sections of the resilient plate 260 separated by the slots 278 are deformable in response to the pressure difference between the vortex chamber 264 and the fluid reservoir chamber 40.

In the compression stroke, as similar to the foregoing first embodiment, the volume of the upper chamber 46 is increased and the volume of the lower chamber 48 is reduced to produce a pressure difference between the fluid in the upper and lower chambers 46 and 48. Due to the produced pressure difference, the fluid in the lower chamber 48 flows to the upper chamber via the piston vortex chamber 166. During the fluid flow from the lower chamber 48 to the vortex chamber 166, the flow of the fluid is limited by the central opening 178 to generate an absorbing force against the shock applied to the shock absorber. If the pressure difference between the lower chamber 48 and the vortex chamber 166 becomes greater than a set pressure provided for the resilient plate 64, the sections separated by the slots 180 are deformed to increase the area allowing the fluid flow therethrough. This will serve as a relief valve for preventing surge in the fluid flow during the piston compression stroke.

At the same time, corresponding to increase in fluid pressure in the lower chamber, the fluid in the lower chamber 48 flows into the vortex chamber 264 of the bottom fitting 250 via the vortex passages 270 to generate a vortex in the vortex chamber 264. Due to the vortex in the vortex chamber 264, the flow of the fluid in the lower chamber 48 to the vortex chamber 264 is limited to create the absorbing force against the shock applied to the shock absorber.

On the other hand, in the expansion stroke, the fluid in the reservoir chamber 40 and in the upper chamber 46 flows into the lower chamber 48 via the vortex chambers 166 and 264. During fluid flow through the vortex chamber 166 from the upper chamber 46 to the lower chamber 46, a vortex is generated in the vortex chamber 166 to limit the flow of the fluid in the upper chamber, thus acting to absorb the shock applid to the shock absorber. On the other hand, during fluid flow through the vortex chamber 264 from the fluid reservoir chamber 40 to the lower chamber 48, the central opening 276 of the resilient plate 260 serves to limit the flow of the fluid in the fluid reservoir chamber 40. If the pressure difference between the fluid reservoir chamber 40 and the vortex chamber 264 becomes greater than a set pressure of the resilient plate 260, the sections separatted by the slots 278 are deformed to increase the effective cross-sectional area of the central opening 276.

If the pressure difference between the fluids in the lower chamber 48 or the fluid reservoir chamber 40 and the vortex chambers 166 and 164 respectively also becomes greater than the set pressure of the resilient plates 164 or 260, the slots 180 and 278 permit increase of the area permitting fluid flow. This prevents the shock absorber from creating absorbing force greater than a predetermined value. Also, the resilient plates 164 and 260 serve as pressure-relief valves for preventing surge in the fluid flow.

Figure 16:
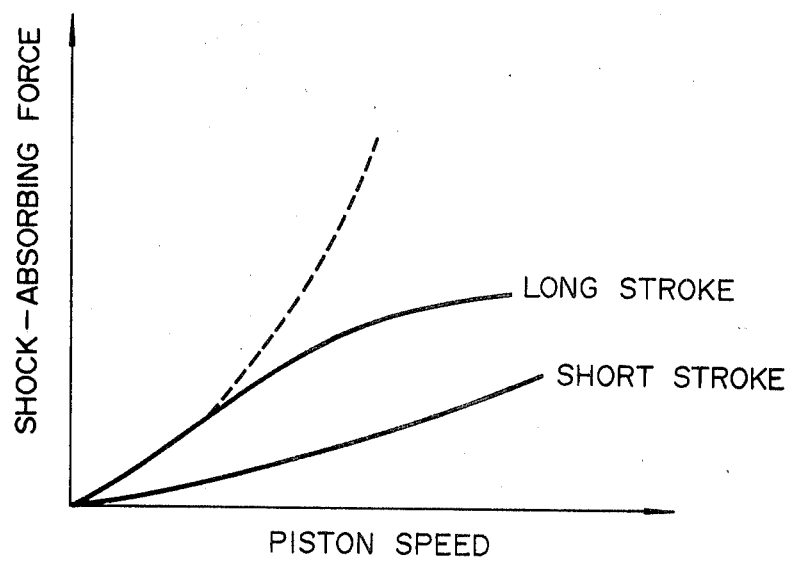
FIG. 16 is a graph showing the relationship between the absorbing force produced by the shock absorber of the second embodiment and piston stroke.

FIG. 16 shows characteristics of the absorbing force produced by the shock absorber having the piston and bottom fitting according to the second embodiment as set forth hereabove. The dashed line indicates characteristics of a prior-art shock absorber. The absorbing force in FIG. 16 varies corresponding to the piston speed and piston stroke. As apparent from FIG. 16, the relief valve provided in the piston and the bottom fitting serves for relieving the absorbing force when the absorbing force produced becomes greater than a predetermined value.

Figure 21:
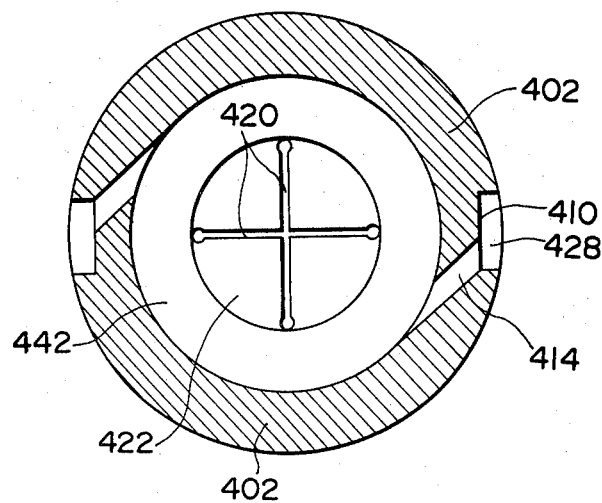
FIG. 21 shows an enlarged cross-section of the piston of FIG. 20 taken along line 21—21 of FIG. 19.

It will be appreciated that, although the first and second embodiments of the present invention have been illustrated hereabove in connection with the direct-acting shock absorbers, it is of course possible to apply the present invention to a double-action shock absorber. For example, FIGS. 17 and 21 show embodiments of the present invention showing the piston of the present invention employed in a double-action shock absorber.

Figure 17:
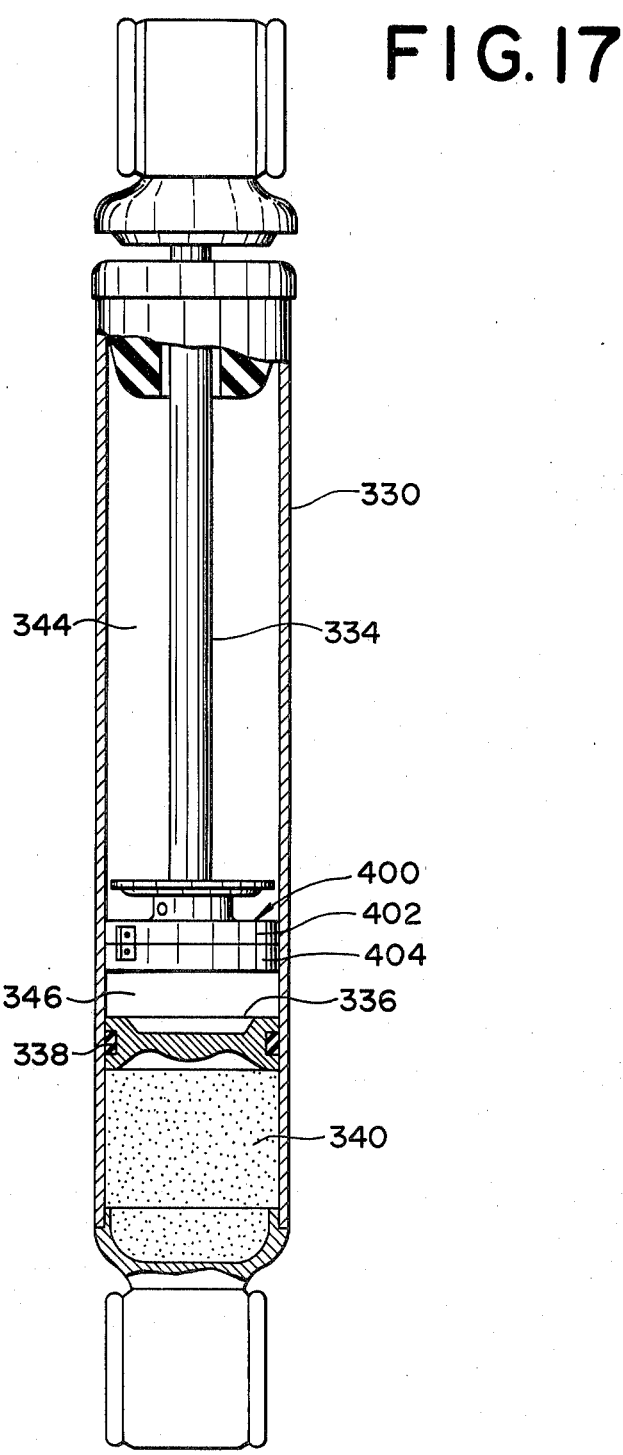
FIG. 17 shows a longitudinal section of the third embodiment of the shock absorber according to the present invention, in which is illustrated a double-action shock absorber.
Figure 18:
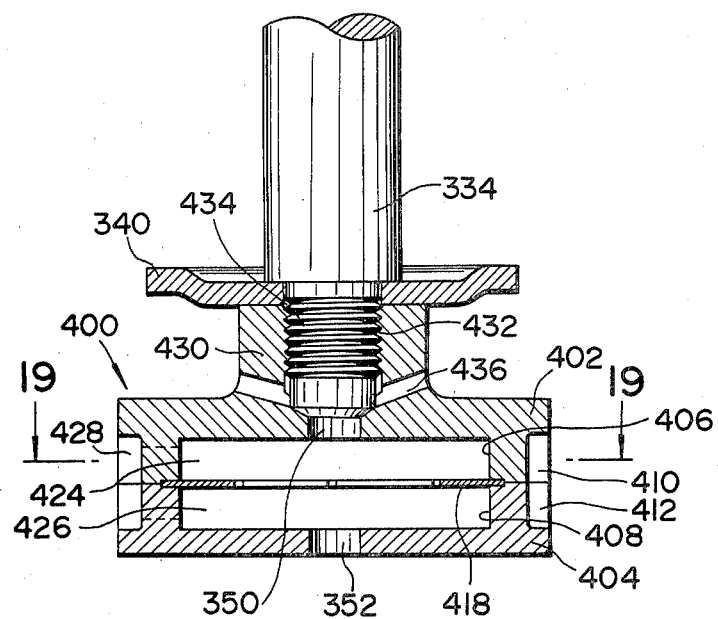
FIG. 18 shows an enlarged cross-section of the piston employed in the shock absorber of FIG. 17.
Figure 19:
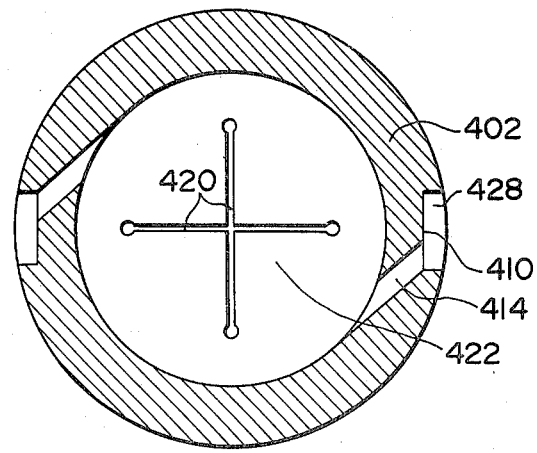
FIG. 19 shows an enlarged cross-section of the piston of FIG. 18, taken along line 19—19 of FIG. 18.

Referring to FIGS. 17 to 19, there is illustrated a double-action shock absorber according to the third embodiment of the present invention. The shock absorber comprises a hollow cylinder 330 and a piston 400 movably disposed within the cylinder 330. The piston 400 is secured on the lower end of a piston rod 334 which has an upper end extending out of the cylinder 330 and attached to a vehicle body chassis (not shown). On the other hand, the lower end of the cylinder 330 is attached to a wheel axle (not shown). A free piston 336 with annular sealing ring 338 is also movably disposed within the tube to define within the cylinder 330 a pneumatic chamber 340. A chamber 342 defined within the cylinder 330 and filled with a working fluid is divided into upper and lower chambers 344 and 346 respectively by the piston 400.

As shown in FIGS. 18 and 19, the piston 400 comprises upper and lower predominately disc-shaped members 402 and 404 respectively formed with horizontally-oriented circular recesses 406 and 408 respectively. The upper and lower members are formed with recesses 410 and 412 respectively on the circumferences thereof. Vortex passages 414 and 416 are defined in the piston 400 such that the outer ends of the vortex passages 414 and 416 open toward the recesses 410 and 412 respectively and the inner ends thereof open toward the recesses 406 and 408 respectively. The inner ends of the vortex passages 414 and 416 are directed tangentially along the circumference of the recesses 406 and 408 respectively. A resilient plate 418 is interposed between the upper and lower members 402 and 404. The resilient plate 418 has a diameter substantially equal to that of the recesses 406 and 408.

The resilient plate 418 is formed with a plurality of slots 420 extending from the center thereof. The sections 422 of the resilient plate 418 separated by the slots 420 are deformable responsive to the pressure difference between the upper and lower sides thereof.

Upon assembly, the planes having the recesses 406 and 408 face each other. The resilient plate 418 is mounted within the recesses 406 and 408. In this position, the upper and lower members 402 and 404 are secured to one another with the resilient plate therebetween. For securing the upper and lower members 402 and 404, it is possible to use any suitable process to detachably or fixedly couple them.

Thus, the assembled piston 400 defines upper and lower vortex chambers 424 and 426, respectively, therein. Also, the piston 400 has vertical vortex passages 428 on its circumference, which are defined by the internal periphery of the cylinder 330 and the recesses 410 and 412. The vertical vortex passages 428 establish communication between the vortex chambers 424 and 426.

The upper member 402 of the piston 400 is provided with a projecting portion 430 with a threaded bore 432 on the surface facing the piston rod 334. The piston rod 334 has a threaded portion 434 at the lower end thereof. The threaded portion 434 engages with the threaded bore 432 for attaching the piston 400 onto the lower end of the piston rod 334. A dish-shaped member 340 is mounted on the top of the projecting portion 430 and secured thereto by engagement of the threaded portion 434 and the threaded bore 432. A pair of radial passages 436 extend radially through the projecting portion 430. The outer ends of the passages 436 open into the upper fluid chamber 344 at the circumference of the projecting portion 430 and the inner ends thereof open toward the threaded bore 432. The threaded bore 432, in turn, communicates with the upper vortex chamber 424 via an opening 350. On the other hand, the lower member 404 of the piston 400 is formed with an opening 352 in its central portion for communication between the lower vortex chamber 426 and the lower fluid chamber 346.

In the compression stroke, the volume of the lower fluid chamber 346 is reduced corresponding to the downward movement of the piston 400 to increase the fluid pressure therein. The downward movement of the piston 400, in turn, decreases the fluid pressure in the upper fluid chamber 344 due to expansion of the volume of that chamber.

As a result, the fluid in the lower chamber 346 flows into the upper chamber 344 via the piston 400. The fluid in the lower fluid chamber 346 enters the lower vortex chamber through the opening 352. The fluid flows via the lower vortex chamber 426, the vortex passage 408, the vertical vortex passage 428 and the vortex passage 406 into the upper vortex chamber 424. From the vortex passage 406, the fluid is discharged into the upper chamber 424 along a tangent to the circle of the upper vortex chamber 424 in order to produce a vortex therein. Thereafter, the fluid flows into the upper chamber 344 via the opening 350 and the passages 436. At this time, the fluid passages 436 serve as orifices to limit the flow therethrough. Also the vortex passages 408 and 406 limit the flow of fluid therethrough to produce resistance against fluid flow.

If the piston stroke is relatively small, the resistance against the fluid flow produced by the vortex in the upper vortex chamber 424 is insignificant. The fluid passages 436 and the vortex passages 425 and 427 serve to provide resistance against the fluid flow at this time. For a short piston stroke, the absorbing force against the shock which, in turn, corresponds to the resistance against the fluid flow, is mainly produced by the orifice effect provided by the fluid passages 436 and the vortex passages 416 and 414. When the piston stroke exceeds a predetermined value, the resistance againsst the fluid flow provided by the vortex in the upper vortex chamber 424 becomes sufficient to absorb the shock. The threshold where the piston stroke becomes great enough to absorb the shock is determined by the dimensional relationship between the effective cross-sectional area of the piston and the cross-sectional area of the vortex chamber.

If the pressure difference between fluids in the lower and the upper vortex chambers becomes greater than that of a predetermined value which is determined by a set pressure of the resilient plate 418, the sections 422 of the resilient plate 418 are deformed toward the lower vortex chamber 426. This permits unhindered fluid flow between the lower and upper vortex chambers and thus relieves the fluid pressure in the upper vortex chamber 424. This will prevent the shock absorber from producing too much absorbing force against the shock applied thereto.

In expansion stroke of the piston, the fluid flow is directed from the upper chamber 344 to the lower chamber 346. At this time, the fluid flowing from the upper chamber 344 flows through the upper vortex chamber 424 to the lower vortex chamber 426 to produce the vortex therein. If the piston stroke is smaller than a predetermined value or the piston speed is lower than a predetermined value, the resistance against the fluid flow produced by the vortex is in the lower vortex chamber 426 is insignificant. At this time, therefore, the absorbing force corresponds mainly to office effect provided by the radial passages 436 and the vortex passages 416 and 414. When the piston stroke is large enough to produce a vortex with sufficient resistance against the fluid flow, the resistance against the fluid flow provided by the vortex becomes the major factor of the absorbing force.

Similarly to the foregoing compression stroke, the resilient plate 418 serves as a pressure-relief valve for relieving excessive fluid pressure in the lower vortex chamber.

Figure 20:
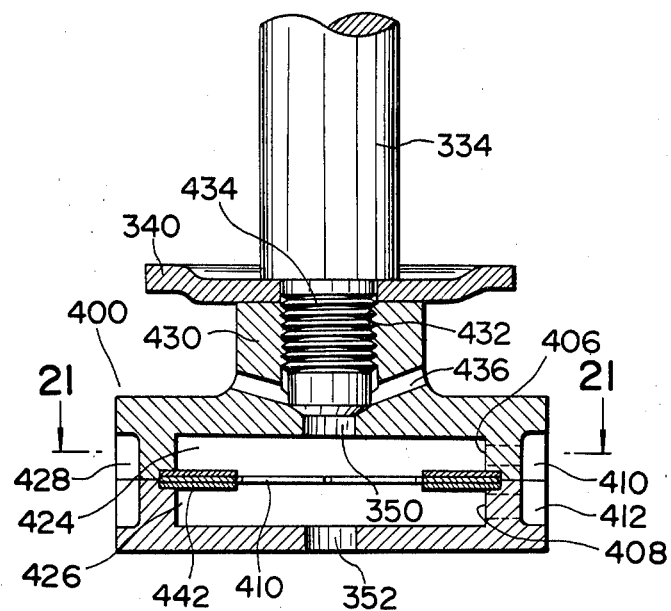
FIG. 20 shows an enlarged section similar to FIG. 18 but showing a modification of the piston of the third embodiment.

It will be understood that the third embodiment illustrated can be modified otherwise. For example, FIGS. 20 and 21 show a modification of the third embodiment of the present invention. In this embodiment, the resilient plate 440 is provided with an annular reinforcement member 442 on both surfaces thereof along the circumferential edge. The reinforcement member 442 is secured between the upper and lower members 402 and 404 together with the resilient plate 440. The reinforcement member 442 serves to apply tension to the resilient plate so that the resilience of the resilient place serves solely for valve purposes and not for structural purposes.

Thus, the present invention fulfills all of the objects and advantages sought thereto.

While the present invention has been illustrated in detail with reference to the specific embodiments respectively embodying the present invention, it should be appreciated that the invention can be embodied otherwise and therefore includes all the possible modifications embodied without departing from the principles of the present invention set forth hereabove and/or in appended claims.

What is claimed is:

1. A hydraulic shock absorber comprising:
a hollow cylinder defining therein a fluid chamber filled with a working fluid;
a piston movably disposed within said fluid chamber to divide the fluid chamber into first and second chambers, said piston being formed with a circular recess on one surface thereof;
a resilient member disposed within said circular recess and defining a vortex chamber together with said piston, said resilient member having means for defining first and second fluid passages for communication between said first chamber and said vortex chamber, said second passage being normally closed and responsive to a pressure difference between said first chamber and said vortex chamber greater than a set pressure provided by said resilient member to open; and
means for establishing communication between said second chamber and said vortex chamber so that the fluid flowing into said vortex chamber from said second chamber generates a vortex in said vortex chamber.

2. A hydraulic shock absorber comprising:
a hollow cylinder defining therein a fluid chamber filled with a working fluid;
a piston movably disposed within said fluid chamber to divide the fluid chamber into first and second chambers, said piston being formed with a circular recess on the lower surface thereof;
a member disposed within said circular recess to define a vortex chamber within said recess, said member defining a first passage normally open to permit fluid flow therethrough in a first direction from said vortex chamber to said first chamber and in a second direction from said first chamber to said vortex chamber, and a second passage normally closed elastically such that when the fluid pressure difference between said first chamber and said vortex chamber is greater than a set pressure, the second passage opens to permit fluid flow in the second direction;
means for establishing communication between said second chamber and said vortex chamber so that the fluid flowing into said vortex chamber from said second chamber generates a vortex in said vortex chamber.

3. A hydraulic shock absorber comprising:
a hollow cylinder defining a fluid chamber filled with a working fluid;
a piston disposed within said fluid chamber to divide said fluid into first and second chambers, said piston having a circular recess on the lower plane thereof;
a member movably disposed within said circular recess to define a vortex chamber within said circular recess, said member having a first passage normally open to permit the fluid flow in the first direction from said first chamber to said vortex chamber and in the second direction from said vortex chamber to said first chamber, and a second passage, which is closed when said member is held in a first position and open when the member is moved to a second position, said member being normally urged toward said first position and being moved to said second position when the fluid pressure difference between said first chamber and said vortex chamber is greater than a predetermined value; and
means for establishing communication between said second chamber and said vortex chamber in such a manner that the fluid flowing into said vortex chamber from said second chamber generates a vortex in said vortex chamber.

4. A hydraulic shock absorber comprising:
a hollow cylinder defining therein a fluid chamber filled with a working fluid;
a piston movably disposed within said fluid chamber and dividing said fluid chamber into first and second chambers, said piston having a circular recess on the lower plane thereof;
a resilient member secured by its circumferential edge along the internal periphery of said recess, said resilient member defining a vortex chamber within said circular recess, a first passage for communication between said first chamber and said vortex chamber, and a second passage, whose condition is variable between first and second position depending on the fluid pressure difference between said first chamber and said vortex chamber, said second passage being normally held in said first position to block the fluid flow therethrough and being displaced to said second position when the pressure difference between said first chamber and said vortex chamber is greater than a predetermined value; and means for establishing communication between said second chamber to said vortex chamber so that the fluid flowing into said vortex passage from said second chamber is discharged tangentially to generate a vortex in said vortex chamber.

5. A direct-acting shock absorber comprising:
an inner hollow cylinder defining therein a fluid chamber filled with a working fluid;
an outer hollowing cylinder coaxially arranged with said inner cylinder, of diameter larger than that of said inner cylinder, thereby defining a fluid reservoir chamber between said inner cylinder and said outer cylinder;
a reciprocating piston movably disposed within said fluid chamber to divide the fluid chamber into first and second chambers, said piston having a circular first recess on its lower surface, said first recess communicating with said first chamber via first vortex passages which open toward the first recess tangentially;
a first valve member disposed within said first recess to define therein a vortex chamber, said first valve member including a first passage constantly open for communication between said first vortex chamber and said second chamber, and a second passage, said first valve member being movable between a first position where said second passage is closed and a second position where said second passage is open;
a fitting attached to the lower end of said inner cylinder, which defines a second circular recess therein, and said second recess communicating with said second chamber via second vortex passages opening into said circular recess tangentially; and
a second valve member disposed within said second recess of said fitting to define within said second recess a second vortex chamber, said second valve member defining a third passage constantly open for communication between said second vortex chamber of said fitting and said fluid reservoir chamber, and a fourth passage, said second valve member being movable between a third position where said fourth passage is closed and a fourth position where said fourth passage is open, said second valve member being responsive to the fluid pressure difference between said vortex chamber and said fluid reservoir chamber to move from said third position to said fourth position when the pressure difference is greater than a predetermined value.

6. A direct-acting shock absorber comprising:
an inner hollow cylinder defining therein a fluid chamber filled with a working fluid;
an outer hollow cylinder coaxially arranged with said inner cylinder, of diameter larger than that of said inner cylinder, defining therebetween a fluid reservoir chamber;
a reciprocating piston movably disposed within said fluid chamber and dividing said fluid chamber into upper first and lower second chambers, said piston being formed with a circular first recess on its lower surface, said first recess being in communication with said first chamber via first vortex passages extending through said piston and tangentially opening into said first recess;
a resiliently-biased first valve member disposed within said first recess to define a first vortex chamber therewithin, said first valve member being normally biased toward a first position in which said first valve member establishes communication between said first vortex chamber and said second chamber with a limited open area and movable to a second position in which the open area for communication between said first vortex chamber and said second chamber is increased, said first valve member being movable from said first position to said second position in response to the fluid pressure difference between said first vortex chamber and said second chamber exceeding a predetermined value;
a fitting attached onto the lower end of said inner cylinder, said fitting being formed with a circular second recess on the lower surface thereof, said second recess communicating with said second chamber via second vortex passages having inner ends tangentially opening into said second recess; and
a resiliently-biased second valve member disposed within said second recess to define a second vortex chamber within said second recess, said second valve member being normally biased toward a first position in which said second valve member establishes communication between said second vortex chamber and said fluid reservoir chamber with limited open area and movable to a second position in which said vortex chamber communicates with said fluid reservoir chamber with increased open area when the fluid pressure difference between said second vortex chamber and said fluid reservoir chamber becomes greater than a predetermined value.

7. A double-action shock abosrber comprising:
a hollow cylinder defining a fluid chamber filled with a working fluid;
a reciprocating piston movably disposed within said fluid chamber to divide the fluid chamber into an upper first chamber and a lower second chamber, said piston having therein a cross-sectionally circular chamber, which communicates with said first and second chambers via first passages permitting fluid flow at a limited rate; and
a elastic partitioning member disposed within said circular chamber of said piston for separating the circular chamber into upper first and lower second vortex chambers, said partitioning member having a second passage therethrough, of which the open area varies depending on the pressure difference between said first and second vortex chambers, said first and second vortex chambers communicating with each other via vortex passages provided in said piston.

* * * * *